United States Patent Office 3,337,644
Patented Aug. 22, 1967

3,337,644
SELECTED FLUORINATED GLYCOLS
John J. Drysdale, Hockessin, Del., assignor to E. I. du Pont de Nemours and Company, Wilmington, Del., a corporation of Delaware
No Drawing. Filed Dec. 14, 1965, Ser. No. 513,813
2 Claims. (Cl. 260—633)

ABSTRACT OF THE DISCLOSURE

Glycols of the general formula $R^1$CHOHCHOH$R^2$, where $R^1$ and $R^2$ are perfluoro-, ω-hydroperfluoro-, or ω-chloroperfluoroalkyl of 3–14 carbons, e.g., 4H,5H-tetradecafluoro-4,5-octanediol, useful as intermediates to fluorinated condensation polyesters and as dispersing agents.

Related applications

This application is a continuation-in-part of my copending application Ser. No. 136,202, filed Sept. 6, 1961, and now U.S. Patent 3,240,811, itself a continuation-in-part of my copending application Ser. No. 825,631, filed June 19, 1959, and now U.S. Patent 3,012,069.

Field and summary of the invention

This invention relates to, and has as its principal object provision of, new polyfluorinated 1,2-glycols.

In my above-mentioned Patent 3,012,069, the reaction of polyfluoroacyl halides with nickel carbonyl in the presence of benzonitrile at temperatures below 40° C. is shown to result uniquely in the formation of polyfluorocarbyl acyloin esters and enediol diesters. It is also shown that the polyfluorocarbyl acyloin esters and enediol diesters are intermediates to corresponding acyloins, 1,2-glycols and 1,2-diketones. The 1,2-glycols are the compounds of this invention, the derived acyloins and 1,2-diketones being claimed in Patent 3,240,811. The complete specifications of my Patents 3,012,069 and 3,240,811 are incorporated herein by reference.

The present novel compounds can be described by the general formula

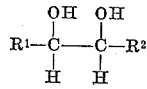

in which $R^1$ and $R^2$ are perfluoro-, ω-hydroperfluoro-, or ω-chloroperfluoroalkyl radicals of 3–14 carbons. These novel polyfluorinated 1,2-diglycols, also called α-glycols, can readily be obtained by reduction of any of the polyfluorinated acyloin esters or enediol diesters of Patent 3,012,069 or the derived acyloins of Patent 3,240,811.

Reduction of the precursor acyloin esters, enediol diesters and derived acyloins to the 1,2- (or α-) glycols can be carried out by any conventional chemical means and is most simply effected by hydrogen itself. Reaction conditions can vary as known to those skilled in the hydrogenation art. With these polyfluorinated acyloin esters, enediol diesters, and acyloins, reduction to the polyfluorinated α-glycols can be effected under the mildest of conditions, e.g., room temperature at 40 lb. hydrogen pressure or thereabouts. Generally some kind of inert reaction medium will be used, such as acetic acid. Catalysts may be used to effect the reaction faster under even milder techniques. With some of the longer chain polyfluorinated acyloin esters, polyfluorinated enediol diesters, and polyfluorinated acyloins, higher temperatures and higher hydrogen pressures will be required, but normally the reduction to the polyfluorinated α-glycols will not require conditions appreciably more stringent than 100° C. at 1000 lb. hydrogen pressure.

Examples of the new polyfluorinated α-glycols that may be obtained readily by the reduction of suitable acyloin ester, enediol ester or derived acyloin precursors by essentially the procedure of the example below include:

6H,7H-docosafluoro-6,7-dodecanediol from 7H - docosafluoro-6-oxo - 7 - dodecyl perfluorohexanoate or 7H-docosafluoro-7-hydroxy-6-dodecanone;

1H,7H,8H,14H-tetracosafluoro-7,8 - tetradecanediol from 1H,14H-tetracosafluoro-7-tetradecene-7,8 - diol di(7H-dodecafluoroheptanoate);

1H,11H,12H,22H-tetracontafluoro - 11,12 - docosanediol from 1H,12H,22H - tetracontafluoro-12-hydroxy - 11-docosanone;

5H,6H,1,10-dichlorohexadecafluoro-5,6 - decanediol from 1,10 - dichloro-5-decene-5,6-diol di(5-chlorooctafluorovalerate) or 1,10-dichlorohexadecafluoro-6-hydroxy-5-decanone;

15H,16H-hexapentacontafluoro - 15,16 - triacontanediol from 16H - hexapentacontafluoro-16-hydroxy-15 - triacontanone;

1H,9H,10H,18H - dotriacontafluoro-9,10-octadecanediol from 1H,10H,18H - dotriacontafluoro - 9-oxo-10-octadecyl 9H-hexadecafluoro-nonanoate;

7H,8H,1,14-dichlorotetracosafluoro - 7,8 - tetradecanediol from 8H,1,14 - dichlorotetracosafluoro-7-oxo-8-tetradecyl 7-chlorododecafluoroheptanoate;

1H,15H,16H,30H-hexapentacontafluoro-15,16 - triacontanediol from 1H,16H,30H-hexapentacontafluoro-15-oxo-16-triacontyl 15H - octacosafluoropentadecanoate;

1H,4H,5H,8H - dodecafluoro - 4,5 - octanediol from 1H,5H,8H-dodecafluoro-4-oxo-5-octyl 4H - hexafluorobutyrate;

4H,5H,1,8-dichlorododecafluoro-4,5-octanediol from 1,8-dichlorododecafluoro - 4 - octene-4,5-diol di(3-chlorohexafluorobutyrate);

9H,10H-tetratriacontafluoro - 9,10 - octadecanediol from perfluoro-9-octadecene-9,10 - diol di(perfluorononanoate);

and 15H,16H,1,30-dichlorohexapentacontafluoro - 15,16-triacontanediol from 1,30 - dichlorohexapentacontafluoro-15-triacontene-15,16-diol di(15 - chlorooctacosafluoropentadecanoate).

Embodiment of the invention

There follows a nonlimiting example submitted to illustrate further the present invention. In this example, unless otherwise indicated all pressures are ambient atmospheric and all parts are by weight.

EXAMPLE

A mixture of 11.2 parts of the enediol diester perfluoro-4-octene-4,5-diol di(perfluorobutyrate) (see Examples III and IV of Patent 3,012,069), 105 parts of acetic acid, and 0.2 part of 10% palladium-on-carbon catalyst was shaken in a conventional glass hydrogenation apparatus under 40 lb./sq. in. hydrogen pressure at room temperature for 18 hours. The resulting reaction mixture was vented to the atmosphere, removed from the reactor, filtered, and the filtrate was diluted with 200 parts of water saturated with sodium chloride. The resultant mixture was extracted with about 70 parts of diethyl ether. After removal of the diethyl ether from the ether extract and subsequent purification by distillation, there was obtained 4H,5H-tetradecafluoro-4,5-octanediol as a clear, colorless liquid boiling at 80° C. under a pressure corresponding to 25 mm. of mercury. On standing, the dihydrotetradecafluorooctanediol solidified. Recrystallization from chloroform afforded pure 4H,5H-tetradecafluoro-4,5-octanediol in 50% yield as a white crystalline solid melting at 71–73° C. Flourine and proton nuclear magnetic resonance were consistent with the dihydrotetradecafluorooctanediol structure.

*Analysis.*—Calcd. for $C_8H_4F_{14}O_2$: F, 66.8%. Found: F, 66.4%.

The polyfluorinated 1,2- or α-glycols of this invention have obvious utility as intermediates in the formation of polyfluorosubstituted condensation polyesters. For example, solid linear polyesters with dibasic acids such as adipic or terephthalic acids can be prepared from the α-glycols and the dimethyl esters of the acids by well-known ester interchange procedures. These polyesters have the usual utilities of such, e.g., in forming films, fibers and the like. The glycols are also useful as surfactants, i.e., dispersing agents, particularly for waxes, oils, and greases, and especially for the polyfluorinated low molecular weight polymers.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

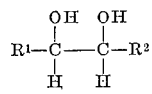

wherein $R^1$ and $R^2$ are selected from the group consisting of perfluoro-, ω-hydroperfluoro-, and ω-chloroperfluoroalkyl radicals of 3–14 carbons.

2. The compound of claim 1 in which $R^1$ and $R^2$ are perfluoropropyl, said compound being 4H,5H-tetradecafluoro-4,5-octanediol.

References Cited
UNITED STATES PATENTS

| | | | |
|---|---|---|---|
| 3,012,069 | 12/1961 | Drysdale | 260—633 |
| 3,129,053 | 4/1964 | Castle | 260—633 |
| 3,240,811 | 3/1966 | Drysdale | 260—593 |

LEON ZITVER, *Primary Examiner.*

BERNARD HELFIN, *Examiner.*

J. E. EVANS, *Assistant Examiner.*